Figure 3:
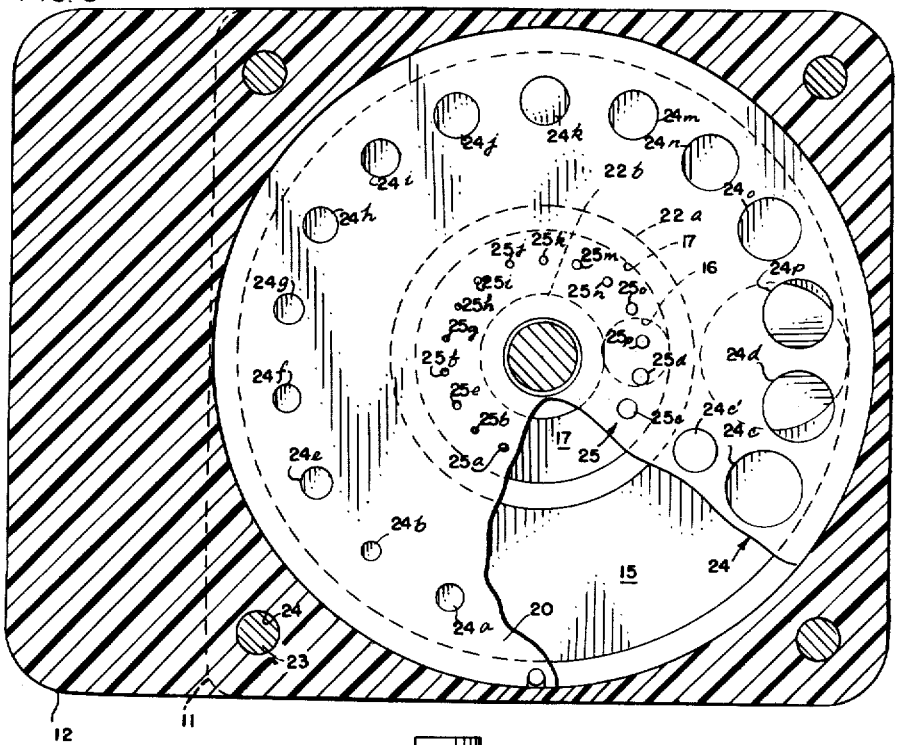

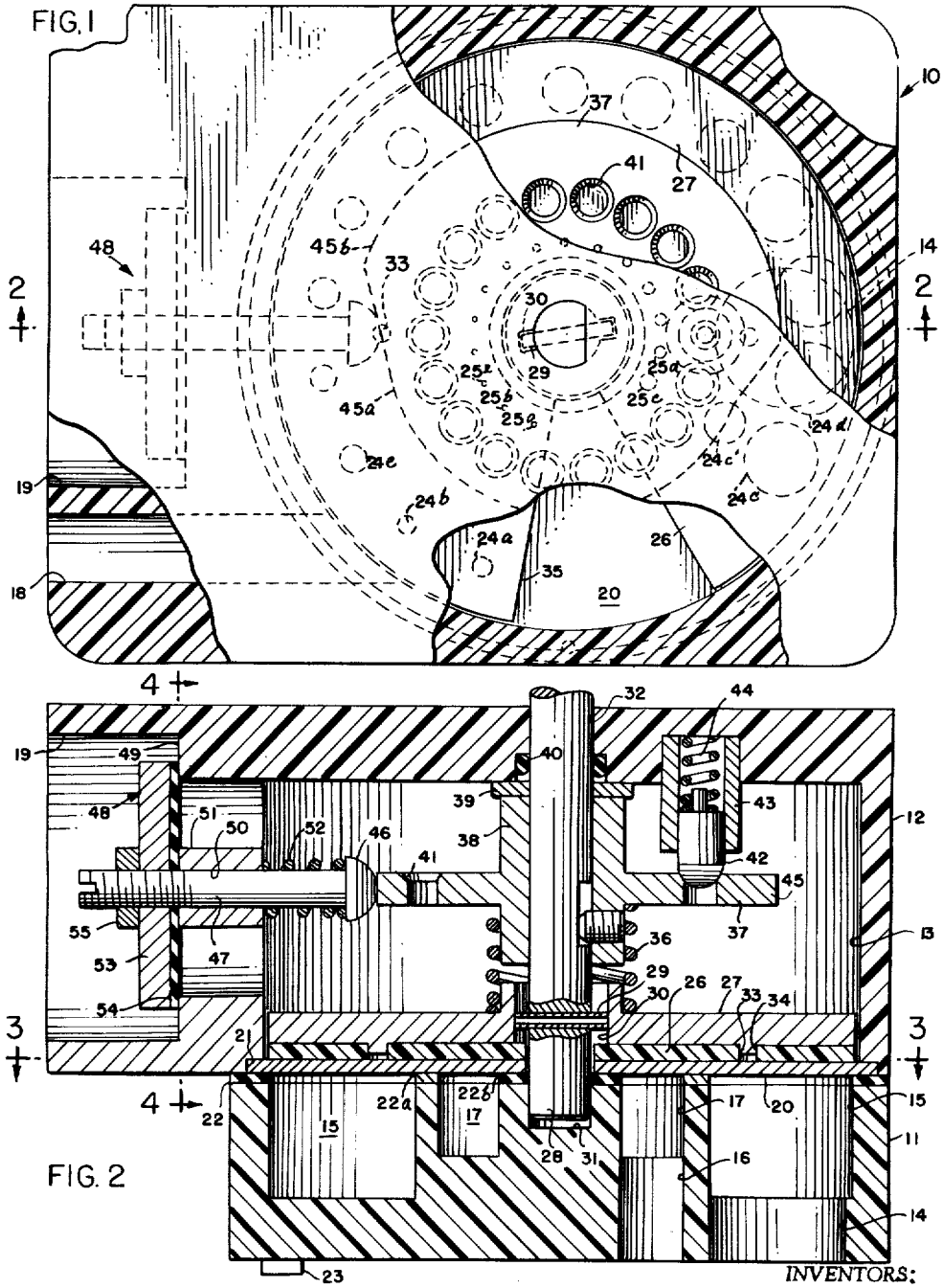

Dec. 26, 1961    J. K. LAMP, JR., ETAL    3,014,489
GAS VALVE

Filed March 17, 1958    2 Sheets-Sheet 2

INVENTORS:
JAMES K. LAMP, JR.
CHARLES R. VAN DER AUE

Schroeder, Hofgren, Brady & Wegner
ATT'YS

United States Patent Office 3,014,489
Patented Dec. 26, 1961

3,014,489
GAS VALVE
James K. Lamp, Jr., and Charles R. Van Der Aue, St. Joseph, Mich., assignors to Whirlpool Corporation, a corporation of Delaware
Filed Mar. 17, 1958, Ser. No. 721,809
4 Claims. (Cl. 137—1)

This invention relates to a gas valve and in particular to a mixing valve.

In power burners, air and combustible gas are delivered to the burner under positive pressure. Efficient combustion in the burner is dependent on a thorough mixing of the air and combustible gas prior to its delivery to the burner. In addition, the ratio of air to combustible gas in the mixture is preferably accurately controlled so that the proper amount of air to provide substantially 100% complete combustion in the burner is provided; any excess of such air would cause a cooling dilution of the combustion products and any deficiency of such air would cause an incomplete combustion.

The known air-gas mixing valves have the serious disadvantage of being relatively delicate. In addition, the known mixing valves are relatively complicated and costly. Further, prior valves ordinarily do not provide accurate control of the ratio over the entire ranges of operation.

The principal feature of this invention is to provide a new and improved air-gas mixing valve avoiding the above discussed disadvantages.

Another feature of the invention is the provision of such a mixing valve having new and improved means for providing a plurality of orifices graduated in size for controlling the inlet of air and gas to the mixing chamber thereof.

A further feature is the provision of such a valve having a new and improved shutter means for controlling the delivery of gas and air through the orifices to vary the delivery of the gas-air mixture through the valve from shutoff to a maximum flow in accurately predetermined steps.

Still another feature of the invention is the provision of such a mixing valve wherein the orifices are provided in a plate and the shutter comprises a rotatable disc having an open portion permitting flow from selected corresponding gas and air orifices dependent on the rotational position of the shutter.

Yet another feature is the provision in such a valve of means for releasably holding the shutter in any one of a plurality of accurately predetermined positions correlated with the arrangement of the orifices to permit gas and air flow from the orifices at accurately predetermined rates.

Yet another feature of the invention is the provision in such a mixing valve of means correlated with the rotational position of the shutter to open an outlet valve controlling a main outlet only when the delivery of gas and air is at or above a predetermined rate sufficient to support a main combustion in a burner means to which the air-gas mixture may be delivered from the mixing valve.

A yet further feature is the provision of such a mixing valve wherein the orifice plate and shutter means are arranged for sliding facial engagement requiring no lubrication therebetween.

Still another feature is that at least one of the orifice plate and shutter is formed of a low friction sealing material.

Figure 4:
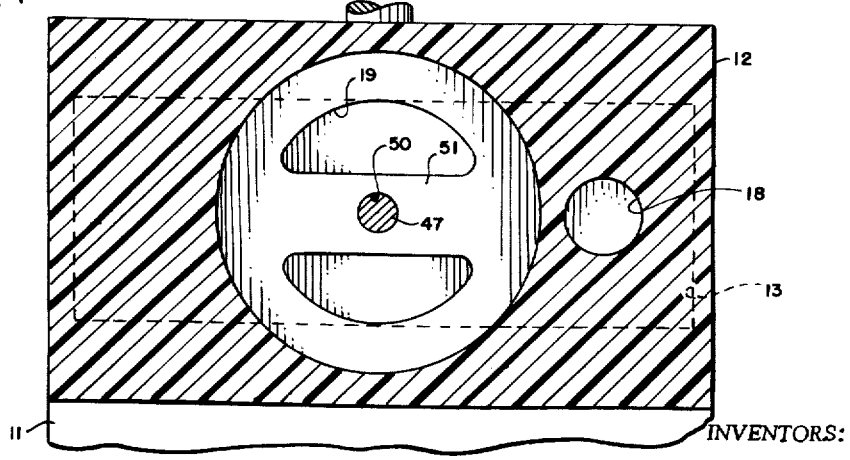

Other features and advantages of the invention will be apparent from the following description taken in connection with the accompanying drawings wherein:

FIG. 1 is a plan view of a mixing valve embodying the invention, with portions thereof broken away;
FIG. 2 is a vertical section taken approximately along the line 2—2 of FIG. 1;
FIG. 3 is a horizontal section taken approximately along the line 3—3 of FIG. 2; and
FIG. 4 is a vertical section taken approximately along the line 4—4 of FIG. 2.

In the exemplary embodiment of the invention, as disclosed in the drawings, a mixing valve comprises a body 10 including an inlet portion 11 and an outlet portion 12. Extending through inlet portion 11 to have communication with a mixing chamber 13 within outlet portion 12 is a first inlet 14 for delivering air under pressure to an annular manifold 15 comprising a recess in inlet portion 11 opening toward mixing chamber 13. Inlet portion 11 is further provided with a second inlet 16 for delivering combustible gas through a second, radially inner, annular manifold 17 to mixing chamber 13.

Outlet portion 12 of body 10 is provided with a pair of outlet passages, a first, continuously open outlet 18 for delivering a small volume of gas-air mixture such as to effect a simmer operation in a power burner, and a second, relatively large outlet 19 for delivering a relatively larger volume of gas-air mixture such as for supporting a main power burner operation. New and improved means are provided for controlling the flow of air and gas into mixing chamber 13 from the respective inlet manifolds. Operatively associated with the inlet controlling means is a means for controlling the main outlet to deliver gas-air mixture therethrough only when the rate of flow through mixing chamber 13 reaches a predetermined point.

More specifically, the means for controlling the gas and air inlets comprises an orifice plate 20 extending transversely across manifolds 15 and 17 between body portions 11 and 12. Plate 20 is peripherally received in a recess 21 in outlet portion 12 and is sealingly secured to body portions 11 and 12 by means of an annular sealing gasket 22 which also seals the body portions to each other upon the tightening of a plurality of securing screws 23 extending through body portion 11 to engage suitable threaded openings 24 in outlet portion 12. Additional annular gaskets 22a and 22b are provided to seal body portion 11 against the underside of orifice plate 20 radially inwardly of manifold 15 and manifold 17, respectively.

Extending through orifice plate 20 is a plurality of air orifices which are arranged annularly in overlying relationship to air manifold 15. A second plurality of orifices through plate 20 extend in a radially inner annular arrangement overlying gas manifold 17. Each of gas orifices 25 is radially aligned with a corresponding air orifice and the successive pairs of aligned orifices are circumferentially spaced from the adjacent pairs by a substantial angle, such as 20°.

The sizes of the radially related orifices are correlated so that each air orifice provides the proper amount of air for mixing with the amount of gas delivered through the corresponding gas orifice to provide 100% theoretical perfect combustion in the power burner. As seen in FIG. 3, the most counterclockwise gas and air orifices 25a and 24a, respectively, are larger than the next clockwise orifices 25b and 24b, respectively. Clockwise from orifices 25b and 24b, the orifices increase in area to the maximum size orifices 25c and 24c, respectively, at the clockwise end of the annular arrangements.

Associated with orifice 24c is an additional orifice 24c' which also overlies air manifold 15 providing a substantially increased air delivery compared to the air delivery from the counterclockwise preceding orifice 24d. The gas orifice 25c corresponding to air orifices 24c and 24c' is correspondingly substantially increased in size over the preceding gas orifice 25d so as to maintain the proper ratio between the gas and air deliveries through the radially related orifices. Between the clockwise and counterclockwise end orifices, the orifices are sized so that clockwise successive pairs have a slightly greater cumulative area than the immediately counterclockwise pairs. An illustrative example of such arrangement is shown in the following table of orifice sizes.

*Orifice sizes*

| Orifice No. | Orifice size | Orifice No. | Orifice size | Orifice No. | Orifice size |
|---|---|---|---|---|---|
| 24a | #48 (.076) | 24o | #4 (.209) | 25j | #64 (.036) |
| 24b | #54 (.055) | 24p | #B (.238) | 25k | #63 (.037) |
| 24e | #42 (.0935) | 24d | #G (.261) | 25m | #57 (.043) |
| 24f | #47 (.0785) | 24c | #G (.261) | 25n | 364 (.0173) |
| 24g | #34 (.1110) | 25a | #75 (.021) | 25o | #53 (.0595) |
| 24h | #36 (.1065) | 25b | #79 (.0145) | 25p | 1/16 (.0625) |
| 24i | #29 (.136) | 25e | #71 (.026) | 25d | #49 (.073) |
| 24j | #30 (.1285) | 25f | #75 (.021) | 25c | #48 (.076) |
| 24k | #29 (.136) | 25g | #68 (.031) | 25c' | #31 (.120) |
| 24m | #19 (.166) | 25h | #69 (.0292) | | |
| 24n | #17 (.173) | 25i | #63 (.037) | | |

Overlying orifice plate 20 is a shutter plate 26 which is held in slidable sealing facial engagement with orifice plate 20 by a backing plate 27. Backing plate 27 is rotatively fixed but axially movable on an operating shaft 28 by means of a pin 29 fixed through the shaft to project from the shaft and slide in an axially extending slot 30 in the mid-portion of backing plate 27. The lower end of the shaft 28 is received in a well 31 in body portion 11 and the upper end of the shaft extends outwardly through a bore 32 in body outlet portion 12 to permit rotation of shaft 28 as desired.

Depending from backing plate 27 is a pair of cylindrical projections 33 which are received in complementary cylindrical apertures 34 in shutter plate 26 and cause the shutter plate to rotate with the backing plate. As best seen in FIG. 1, the shutter plate is provided with a wedge-shaped opening 35 which enlarges radially outwardly at an angle of approximately 40° relative to the axis of shaft 28. In an off position, as shown in FIG. 1, opening 35 is counterclockwise from the counterclockwise last apertures 25a and 24a and is clockwise from the clockwise last apertures 24c, 24c' and 25c. Thus, all of the apertures of plate 20 are covered by the shutter plate 26 and no gas or air flow through the aperture plate occurs. However, by rotating shaft 28 in a clockwise direction, shutter plate 26 is rotated so that opening 35 is moved in a clockwise direction to permit successively greater and greater flows of gas and air through the underlying orifices as they are progressively uncovered.

To maintain shutter plate 26 sealingly against orifice plate 20 and assure that only flow through the orifices uncovered by opening 35 is obtained, shutter plate 26 is formed of a material having low friction and good sealing qualities, such as "Teflon" (tetrafluoroethylene polymer) or nylon. The confronting faces of the orifice plate and the shutter plate are preferably lapped smooth. Thus, no lubricant is necessary to permit the slidable sealing engagement between the orifice plate and shutter plate and the problem of clogging of the small orifices by lubricants is completely obviated. To assure a proper sealing pressure of the shutter plate against the orifice plate, a helical spring 36 is extended under compression between the backing plate 27 and a cam disc 37 rotatively fixed on shaft 28. Spring 36 further urges the hub 38 of the cam disc against an annular thrust washer 39. An O-ring 40 may be provided to seal the shaft 28 rotatively to the body portion 12 in bore 32.

Means are associated with cam disc 37 to center shutter plate 26 in each of a plurality of rotational positions at intervals of 20°. Thus, the shutter plate may be progressively moved in steps of 20° in a clockwise direction from the position shown in FIG. 1 to uncover first the one pair of corresponding orifices 25a and 24a to permit a minimum flow of air and gas from manifolds 15 and 17 into mixing chamber 13. A clockwise movement of shutter plate 26 another 20° next permits both gas orifices 25a and 25b and air orifices 24a and 24b to be concurrently uncovered providing a slightly increased delivery of gas and air to mixing chamber 13. When the shutter plate is moved an additional 20°, orifices 25a and 24a are re-covered and gas orifices 25b and 25e and air orifices 24b and 24e are concurrently uncovered providing an additionally increased delivery of gas and air to mixing chamber 13. In this manner, the delivery of gas and air to chamber 13 is gradually increased as the shutter plate is rotated in a clockwise direction until, at the extreme clockwise movement of the shutter plate, only orifices 24c, 24c' and 25c are uncovered.

To center shutter plate 26 in each of the 20° spaced positions, means are provided for releasably locking the shaft 28 in corresponding 20° spaced positions. These means comprise a plurality of recesses 41 annularly arranged in cam disc 37 at 20° intervals about the axis of shaft 28. A plunger 42 is slidably mounted in a support 43 secured to body portion 12 and is urged by a spring 44 releasably into engagement with recesses 41. Thus, the centering action of plunger 42 in co-operation with recesses 41 causes opening 35 of the shutter plate to be accurately centered so that the edges of the opening are always disposed between circumferentially related orifices when the shaft is adjusted to any of its operating positions assuring full opening of uncovered orifices.

As best seen in FIG. 1, the peripheral edge 45 of disc 37 comprises a cam surface against which rides a cam follower head 46 of a stud 47. Stud 47 comprises a valve rod having a movable valve member 48 mounted on the end opposite head 46 which valve member extends across main outlet 19 to seat on a shoulder 49 therein. Stud 47 extends slidably through a bore 50 in a support portion 51 of body 12 extending transversely across outlet 19 inwardly of shoulder 49. A coil spring 52 extends around stud 47 between head 46 thereof and body support portion 51 to urge head 46 yieldably against edge surface 45 of the cam disc. Valve member 48 comprises a closure disc 53 having a seating face 54 formed of a suitable seating material such as neoprene rubber. The valve member may be retained on stud 47 by means of a suitable nut 55.

Cam surface 45 is arranged to control the axial disposition of stud 47 and, thereby, the opening and closing of outlet 19 by the unseating and seating of valve member 48 relative to shoulder 49. As best seen in FIG. 1, when the shutter plate 26 is arranged to preclude flow of gas and air into chamber 13 and when only a small amount of flow is permitted into chamber 13, a relieved portion 45a of cam surface 45 permits spring 52 to maintain valve member 48 in the seated position on shoulder 49 maintaining outlet 19 closed. This condition obtains untils shutter plate 26 is rotated approximately 180° from the position shown in FIG. 1 at which time the uncovered apertures (24j, 24k, 25j and 25k) are sufficiently large in area to permit a flow of gas and air to chamber 13 which will support a main combustion operation. At such point, an unrelieved outer portion 45b of cam surface 45 engages the stud head 46 and causes the valve member 48 to be unseated from shoulder 49 thereby opening the outlet to permit a main burner operation. As simmer outlet 18 is open at all times, gas and air mixture from chamber 13 is delivered therethrough whenever gas and air are delivered to chamber 13.

The elements of the disclosed mixing valve are rugged and of simple construction. Thus, maintenance of the valve is reduced to a minimum while yet the manufacturing cost of the valve is extremely low. Because of the elimination of the need for a lubricant between the shutter plate and the orifice plate, clogging of the orifices is substantially eliminated, further simplifying maintenance of the valve. Through use of the individual graduated orifices, accurately predetermined rates of flow through the valve are obtained, permitting the user to reproduce accurately desirable combustion rates. Should it be desired to utilize the mixing valve with a combustible gas of a different type than that for which the valve was originally arranged, it is only necessary to replace the orifice plate 20 with a suitable plate arranged for operation with the new combustible gas. This is readily effected by removal of screws 23, permitting the removal of body portion 11 from body portion 12 and the ready substitution of the new orifice plate 20 for the previous one. Body portion 11 is then resecured to body portion 12 by means of studs 23, gasket 22 resealing the body portions and sealing the new orifice plate to the body portions.

In all positions of the shutter plate 26, except in the "off" position, the first clockwise position from "off," and the first counter-clockwise position from "off," it is to be noted that there are two air orifices and two corresponding gas orifices open at all times in any particular setting of the shutter plate. The corresponding pairs of orifices are spaced approximately 20° apart and the opening in the shutter plate is approximately 40°. Thus when the shutter plate is rotated there is always a sufficient amount of combustible mixture to provide a continuous flame because at least one corresponding pair of orifices is open in every position and in all intermediate positions. By utilizing two corresponding pairs of orifices to provide the combustible mixture it not only makes it possible to have continuous combustion when indexing from one position to another, but it also makes possible a much smaller valve because two smaller diameter air orifices are utilized in a selected position rather than one large orifice. This of course makes it possible to have the total diameter of the whole valve unit considerably smaller.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. The method of controlling flow of two fluids from a pair of inlets to a pair of outlets, comprising the steps of: delivering the first fluid from one inlet to a first plurality of graduated spaces; delivering the second fluid from the other inlet to a second plurality of correspondingly graduated spaces; delivering the first and second fluids concurrently to a single third space seriatim from corresponding pairs of said first and second spaces, each pair comprising a space of said first plurality and a space of said second plurality, delivery from at least one of said pairs being discontinued when delivery from at least one larger pair is initiated; delivering said first and second fluids from said third space to a fourth space to mix therein at all times during delivery of the fluids to said third space; delivering at least a portion of the mixed fluids from said fourth space through one of said outlets at all times during delivery of the fluids to the fourth space; and delivering a portion of the mixed fluids from the fourth space through the other of said outlets during delivery of the fluids to preselected pairs of first and second spaces.

2. A fluid mixing valve comprising: a body defining a mixing chamber, a first inlet manifold and a second inlet manifold; a first inlet through the body to the first manifold; a second inlet through the body to the second manifold; a plate having a plurality of first orifices between said first manifold and said mixing chamber for delivering a first fluid from said first inlet and first manifold into said chamber, said orifices being arranged in annularly spaced relationship around an axis, said plate further having a plurality of second orifices between said second manifold and said mixing chamber for delivering a second fluid from the second inlet and second manifold into said chamber, said second orifices being arranged in annularly spaced relationship around said axis at a distance therefrom different from the distance of the first orifices from said axis, said second orifices being substantially radially aligned with the respective first orifices to define a plurality of pairs of radially related first and second orifices; and a shutter rotatable about said axis to move across said orifices alternatively to close concurrently and open concurrently said pairs of first and second orifices, said shutter being provided with an axial opening therethrough, said opening having a radial extent relative to said axis sufficient to overlie concurrently first and second orifices for permitting concurrent flow through different pairs of orifices at different rotational positions of said shutter.

3. The valve of claim 2 wherein said shutter opening is movable through an annular path and opens to the mixing chamber a pair of first orifices and a corresponding pair of second orifices at intermediate positions of the shutter opening in said path.

4. The valve of claim 2 wherein the orifices are graduated in size to provide an increase in total area of circumferentially adjacent pairs of orifices in annular succession.

References Cited in the file of this patent

UNITED STATES PATENTS

| | | |
|---|---|---|
| 167,880 | Donning | Sept. 21, 1875 |
| 601,718 | Soderlund | Apr. 5, 1898 |
| 830,046 | Bole | Sept. 4, 1906 |
| 1,593,127 | Lawless | July 20, 1926 |
| 2,062,749 | Hartwig | Dec. 1, 1936 |
| 2,735,645 | Freed | Feb. 21, 1956 |
| 2,838,292 | Bramming | June 10, 1958 |
| 2,884,004 | Dierdorf | Apr. 28, 1959 |

FOREIGN PATENTS

| | | |
|---|---|---|
| 171,192 | Great Britain | Nov. 17, 1921 |
| 590,794 | Great Britain | July 29, 1947 |